United States Patent [19]
Bamberg et al.

[11] 3,899,250
[45] Aug. 12, 1975

[54] ACTIVE-GATED TELEVISION AUTOMATIC RANGE SWEEP TECHNIQUE

[75] Inventors: Jack A. Bamberg; Hans R. Bucher; John G. Bultena, all of Boulder, Colo.

[73] Assignee: Ball Brothers Research Corporation, Boulder, Colo.

[22] Filed: Feb. 4, 1974

[21] Appl. No.: 439,182

[52] U.S. Cl. ............... 356/5; 178/DIG. 1; 178/6.8; 178/7.2
[51] Int. Cl. .......................... G01c 3/08; H04n 3/00
[58] Field of Search ............ 356/5; 178/6.8, DIG. 1, 178/7.2; 343/7.3, 6 TV

[56] References Cited
UNITED STATES PATENTS

| | | |
|---|---|---|
| 3,467,773 | 9/1969 | Heckmann, Jr. ...................... 178/6.8 |
| 3,723,002 | 3/1973 | Everest et al. .......................... 356/5 |
| 3,743,418 | 7/1973 | Heflinger ................................ 356/5 |
| 3,751,166 | 8/1973 | Starkey et al. .......................... 356/5 |
| 3,752,581 | 8/1973 | Everest et al. .......................... 356/5 |
| 3,810,178 | 5/1974 | Bassard et al. .................... 343/5 SM |

*Primary Examiner*—Maynard R. Wilbur
*Assistant Examiner*—S. C. Buczinski
*Attorney, Agent, or Firm*—James D. Haynes

[57] ABSTRACT

Timing circuitry is used to pulse a light source and enable reception of the reflected energy such that light pulses directed over a predetermined varying range are emitted and received no more than once per scan line to provide a television image of a wide depth of range repetitively during each television frame time wherein all targets within the scanned range have equal intensity. The number of light pulses directed to a particular range interval (spatial energy pulses) may be controlled to thus cause certain ranges to have higher intensities or no intensity in regard to the remainder of the range being scanned.

27 Claims, 5 Drawing Figures

ACTIVE-GATED TELEVISION AUTOMATIC RANGE SWEEP TECHNIQUE

BACKGROUND OF THE INVENTION

The present invention relates to actively illuminated low-light level television (LLLTV) and more particularly to the method and apparatus for simultaneously displaying targets at different ranges. The ability to view objects at ranges of several miles and under conditions of substantial total darkness has presented many difficulties in the past. Numerous devices have evolved which detect targets under such conditions. It can be readily appreciated that in nighttime surveillance of a battlefield area, it is highly desirable to minimize the possibility of detection of the illuminating device and yet provide a display which is the same as could be obtained during normal daylight hours. Accordingly, many devices utilize an illuminant operable in the nonvisible range of the electromagnetic energy spectrum such as infrared or ultraviolet. Since a laser offers a narrow spectral band of infrared radiation and spectral discrimination, i.e., it increases the reflectivity of many materials, there are devices which use a pulsed laser to illuminate the desired area of view. There are range finders which use lasers to effectively search for targets at preselected ranges. In these active-gated laser systems, the range gate interval is successively lengthened upon each successive transmittal of a laser pulse until an echo response is detected whereupon the automatic range sweeping operation is halted. Thus, the presence of a target at a particular range is detected.

While some devices relate to visual display of objects at a predetermined distance and others relate to the ascertainment of only distance to a target, still others disclose means for both visually displaying a particular scene and at the same time determining the distance to the objects therein. U.S. Pat. No. 3,495,906 to Firmin and U.S. Pat. No. 3,649,124 to Takaoka disclose such devices. Firmin periodically illuminates a field of view and uses the propagation time of reflected successive pulses to indicate distance to the object. A special form of display tube is used wherein different deflection rates are utilized for successive pulse illuminations of the target area to result in a display wherein objects located at various ranges within the target area are displaced with respect to one another. Takaoka discloses an active-gated television system which displays successive full-frame images of various ranges as a composite. Each range is displayed as a different color in the composite display to distinguish the various ranges that are being observed. In U.S. Pat. No. 3,682,553 to Kapany, successive entire frames are generated for successively different range distances and combined into a composite display to achieve a three-dimensional view of an object within the target area and the television system.

In known devices the range being examined is held constant for a particular frame time. Since a periodically pulsed illuminator is operated in sequence with a periodically gated TV sensor, the spacing between the illuminator pulse and the gated sensor pulse determines the particular range being observed. The depth of field viewed at a particular range is usually very narrow, i.e., a small spatial energy pulse is used, in order to eliminate atmospheric backscatter. Accordingly, a potential target may be within the field of view and not be detected if the range being examined happens to vary even slightly from the range wherein the potential target is disposed. As the depth of field is increased, the atmospheric backscatter also increases to seriously degrade image quality. Also, the observed interscene brightness of various targets at different ranges varies with the square of the distance to the particular object and with atmospheric conditions through which they are viewed.

There is a need for a low-light level device that will provide surveilance of a wide range and yet provide uniform displayed target brightness. As opposed to providing a device for viewing a first range and then a second range or a composite formed from the stored range increments, there is a need for a device which continually scans a wide depth of ranges to provide a visual image similar to that viewed on a passive television monitor with daylight illumination.

Accordingly, it is an object of the present invention to provide a device which provides a view of a wide depth of field without image deterioration due to backscatter.

It is a further object of this invention to provide a device which displays a wide depth of field wherein the image intensities are constant over the depth of field.

It is yet another object of this invention to provide an active-gated television system wherein a plurality of ranges are scanned and displayed during each television frame time to produce a continuing visual display of an entire wide depth of field.

Another object of this invention is to provide a displayed image which closely simulates that which occurs with natural illumination.

Yet another object of this invention is to provide for target enhancement or suppression at a selected range interval or intervals while simultaneously displaying all other ranges of interest.

SUMMARY OF THE INVENTION

The present invention provides an active-gated television system for scanning a wide depth of field during each television frame to provide an image similar to that of a conventional passive television image. Targets at all ranges are seen simultaneously while the ability to suppress atmospheric backscatter is retained and interscene brightness differences are eliminated.

Illuminator pulses are used to illuminate a particular field of view. The amount of time delay between the illuminator pulse and a pulse which energizes receiving optical means, such as an image intensifier positioned in the optical path of a television camera determines the range displayed on a television monitor. The depth of field at this range is determined by means of a mathematical convolution operation of the illuminator and sensor pulses as hereinafter described and will be referred to as a "spatial energy pulse." Automatic adjustment of the timing between the illuminator pulse and the image intensifier pulse relative to the horizontal and vertical blanking intervals of the camera forming part of the optical means permits an entire depth of range to be scanned during one television frame. The time delay (thereby defining the range) between the illuminator pulse and image intensifier pulse can be the same or different at each successive sweep line such that all ranges of interest are illuminated within a single frame time of the television camera. Since the information received during each scan line is stored and read out only once each frame time and since the television sensor integrates all light input over an entire frame time, all ranges will be visible. These spatial energy pulses are distributed over the ranges in such a manner that the returning energy received by the camera is constant for all ranges. More spatial energy pulses are placed at longer ranges and fewer spatial energy pulses are placed at shorter ranges to exactly compensate for the decrease in energy density at longer ranges due to atmospheric scattering and attenuation over the path length and the spread in the illuminator beam.

If the target range is very long, it may be necessary to illuminate during one scan line and to gate on the image intensifier during a successive scan line in order to allow for the finite speed of light to and from a target. Selected ranges within the depth of field may be examined in greater detail by increasing the number of spatial energy pulses distributed at that particular range. Also, certain ranges may be suppressed by causing no spatial energy pulses to be distributed at that particular range. A spatial energy pulse is in essence the depth of range from which a single pulse of light is reflected and received by optical means. The time lag between the pulsing of the illuminator and the pulsing of the image intensifier of the optical receiving means and the duration of the image intensifier pulse defines the "spatial energy pulse."

This technique permits all targets between an adjustable minimum and maximum range to be illuminated and imaged by the television camera. Image deterioration due to atmospheric backscatter is not serious, due to the described energy distribution technique. Backscatter is more severe at close ranges, but little energy is sensed from there. Similarly, backscatter is little problem at long ranges where many spatial energy pulses are distributed. Since the decrease in energy density has been compensated for by the appropriate distribution of spatial energy pulses, a television image is provided which appears to be uniformly illuminated as in daylight.

DESCRIPTION OF THE DRAWINGS

Other objects, features and advantages of the present invention will be more apparent after referring to the following specification and accompanying drawings in which.

DESCRIPTION OF THE PREFERRED EMBODIMENT

Figure 1:
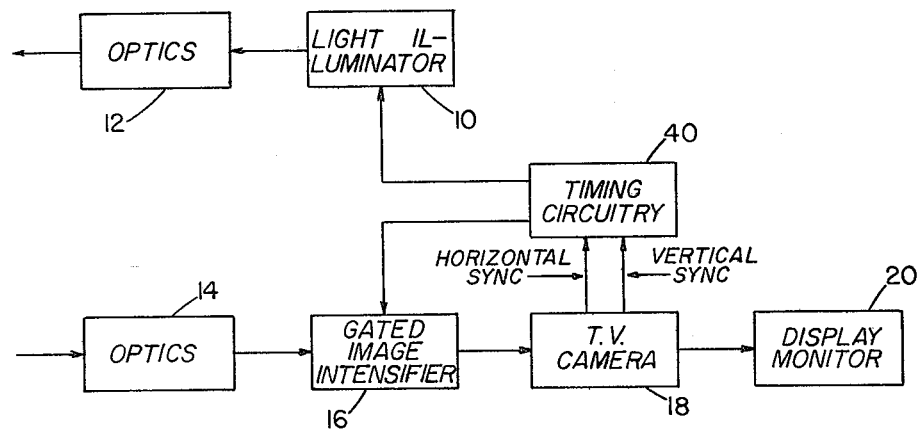
FIG. 1 is a system block diagram of a preferred embodiment of the present invention.

Referring to FIG. 1, repetitively pulsed light illuminator 10 and optical system 12 illuminate a scene of interest. Optical system 14 has the same field-of-view as optical system 12 to thus view the same scene of interest as optical system 12. The image (energy) received by optical system 14 passes through image intensifier 16 to television camera 18 where it is converted to a video signal displayed on standard television monitor 20. Timing circuitry 40 receives both horizontal and vertical drive signals from camera 18 and controls the operation of both illuminator 10 and gated image intensifier 16. The amount of time delay between the illuminator pulse and the image intensifier pulse determines the range to be observed on display monitor 20, due to the finite speed of light making a round trip from the illuminator 10 to camera 18. The timing circuitry 40 provides automatic adjustment of time delay between illuminator and image intensifier pulses in proper synchronism with the horizontal and vertical drive signals of television camera 18.

Figure 2:
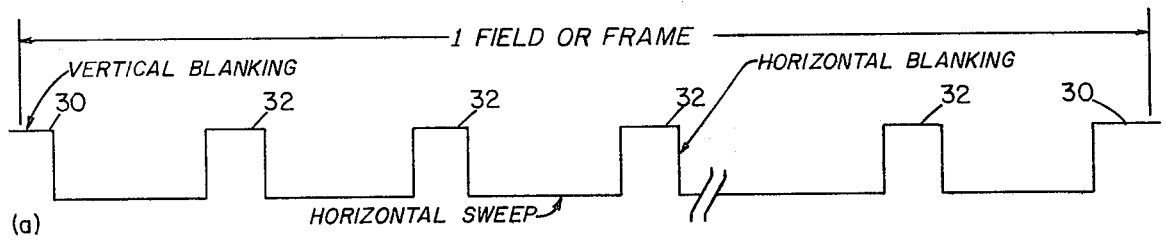
FIG. 2 is a timing diagram showing the time relationship of various pulses employed during operation of the systems of FIG. 1.
Figure 2:
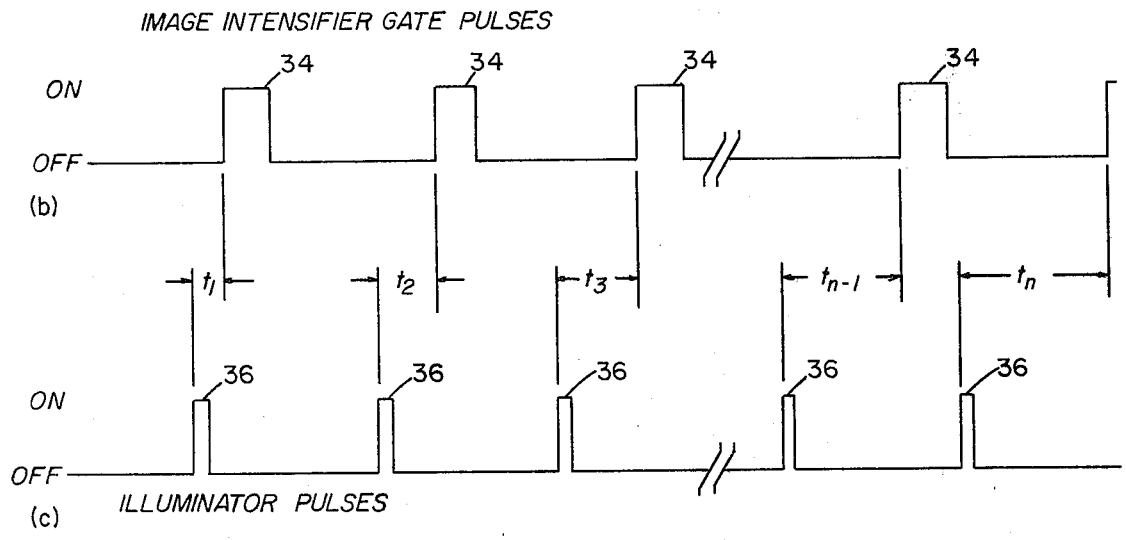

FIG. 2 represents an exemplary timing diagram of the present invention. A single television field in an interlaced scan, or alternatively a single television frame in a non-interlaced scan, is shown at (a) in FIG. 2. Thirty (30) represents the vertical blanking intervals and 32 represents the horizontal blanking intervals. The image intensifier gate pulses 34 are shown at (b) in FIG. 2 and the illuminator gate pulses 36 are shown at (c) in FIG. 2. In the example shown in FIG. 2, one illuminator and one image intensifier pulse occurs for each horizontal line time, although it is not necessary to have a pulse pair associated with every horizontal line time. For example, if the target range is very long, it may be necessary to provide a pulse pair (illuminator and image intensifier pulses) for only every second or third horizontal scan line in order to allow for the finite speed of light to and from such a target.

As shown in FIG. 2, an illuminator gate pulse 36 occurs during an active horizontal sweep while image intensifier 16 is turned off. An image intensifier pulse 34 turns on image intensifier 16 at a later time, $t_1$, after the illuminator gate pulse 36 occurs and also during a horizontal (or vertical) blanking interval in order to receive energy reflected from a target due to a previous illuminator pulse. This time, $t_1$, represents the amount of time delay caused by timing circuitry 40 to thus determine the range viewed. The time between the illuminator pulse 36 and the image intensifier gate pulses 34 may be varied successfully from $t_l$ to $t_n$. These time delays determine the ranges viewed. The desired value of the time delay is generated in timing circuitry 40. These time values may be selected in a manner such that all the ranges of interest may be scanned during one field or frame time.

Figure 3:
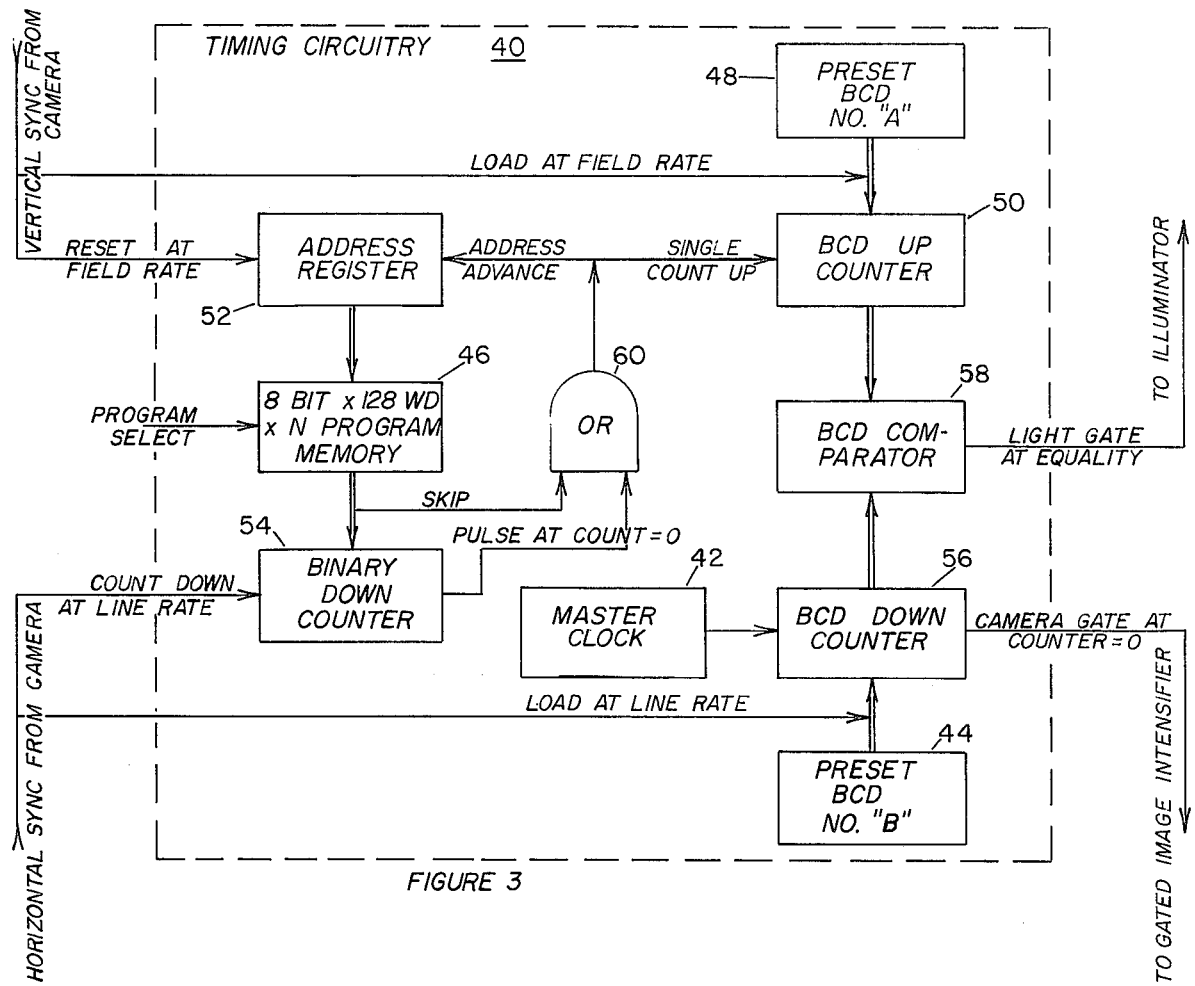
FIG. 3 is a diagrammatic view of one embodiment of the timing circuitry of the present invention.

One embodiment of timing circuitry 40 is shown in greater detail in FIG. 3. Three timing signals serve to operate the timing circuitry. The horizontal and vertical drive pulses from camera 18 act as synchronizing pulses for timing circuitry 40. The frequency of master clock 42 is determined by the range accuracy desired for the system using the formula:

$$f = \frac{c}{2\Delta R}$$

where $f$ is the frequency, $c$ is the velocity of light, and $\Delta R$ is the range accuracy or range increment desired. Range and thus spatial energy pulses are in effect quantized at integer multiples of the range increment $\Delta R$, as far as the issuance of illuminator and camera gate pulses are concerned. The number of range increments equivalent to the minimum illuminated range is stored as BCD number A in register 48. The number of range increments equivalent to one active horizontal line time is stored as binary coded decimal (BCD) number B in register 44. The range corresponding to one active horizontal line time of television camera 18 (disclosed at (a) in FIG. 2) may be calculated using the formula:

$$R = \frac{c\,t}{2}$$

where $c$ is the velocity of light and $t$ is the active horizontal line time of television camera 18. Thus, BCD number B is the number $R/\Delta R$ in binary form. As previously noted, it may be desired to place more spatial energy pulses at certain ranges than at other ranges to either achieve apparent equal illumination or to cause certain ranges to have higher intensities than other ranges. Memory unit 46 stores up to 128 8-bit numbers which represent the number of times it is desired to pulse at each range, starting at the number of increments representative of the minimum range to be viewed (BCD number A) and sequentially progressing to the maximum range to be viewed (less than or equal to BCD number B, provided both the illuminator and camera are gated on during each scan line time). Note that with the particular memory unit 46 shown, 128 different ranges may be pulsed with any given range being pulsed a maximum of $2^8 - 1$ or 255 times. Memory 46 is capable of storing "N" programs which may readily be selected. In one constructed and operating embodiment of this invention, four different programs were stored.

In operation, BCD number A is loaded from register 48 into up counter 50 at the beginning of a television frame. Memory address register 52 is reset which loads the data from the first memory location of memory 46 into binary down counter 54. Accordingly, the data in BCD up counter 50 represents the desired minimum range at which viewing will begin and the data in binary down counter 54 represents the number of times this range will be illuminated and sensed by the camera. At the beginning of each horizontal scan line, BCD number B is loaded from register 44 into BCD down counter 56 and is counted down to zero by master clock 42. The data in counters 56 and 50 are constantly being compared by BCD comparator 58. These data become equal at the desired range whereupon BCD comparator 58 causes illuminator gate pulse 36 (FIG. 2) to be issued. BCD down counter 56 continues to count to zero at which time image intensifier gate pulse 34 is issued. Camera 18 is thus gated on just inside the horizontal blanking pulse since BCD number B and the frequency of master clock 42 were selected as previously described. Data in counter 54 is reduced at the horizontal scan line rate. Thus, the data in counter 54 continually represents the number of times the desired range increment in counter 50 has yet to be used. When the data in counter 54 reaches zero, an output pulse is issued which advances memory address register 52 by 1, causing the data in the next memory location to be loaded into counter 54. The output pulse also causes the desired range increment in counter 50 to be advanced by one. At this point, the cycle continues with the new desired range increment (data in counter 50) being used the desired number of times (data in counter 54). Thus, the placement of the spatial energy pulse continues to increase throughout the television frame in a manner determined by memory 46 and by BCD number A in register 48.

Should it be desired that a particular range increment is to be skipped, a specially coded binary number may be loaded into the corresponding memory location of memory 46.

When this particular binary code is presented as an output of memory 46, binary counter 54 will be bypassed and the specially coded output will cause OR gate 60 to issue a pulse which will update both counter 50 (to the next range increment) and address register 52 in the same fashion as the output from binary down counter 54 did at count equal zero. At the end of the television frame (or field with an interlaced scan) the range sweep has been completed and the whole process begins anew with the loading of BCD number A into counter 50 and the resetting of address register 52.

The down counter 56 will go through all possible range increments during each line time. The number stored in up counter 50 is indicative of a single range which is to be viewed during the present line. Down counter 56 starts at the highest number and rapidly counts down through all ranges at the master clock frequency. When the number stored in up counter 50 and the number in down counter 56 are equal, comparator 58 emits a pulse which causes the illuminator to be energized. Down counter 56 continues to count down until it reaches zero at which time a pulse is emitted to gate on the image intensifier. Similar operation occurs during each line time. Should it be desired to view a particular range, for example, three times, binary down dounter 54 would not provide an output through OR gate 60 to up counter 50 until it had counted down through three lines. At this point it would produce an output pulse which would cause up counter 50 to count up to the next range of interest. Thus, the present invention permits a particular range of interest to be pulsed many times only once, or not at all. The cycle will repeat continuously to thus scan each range of interest during each field or frame time. The present invention will function with either an interlaced scan or a non-interlaced scan.

Figure 4:
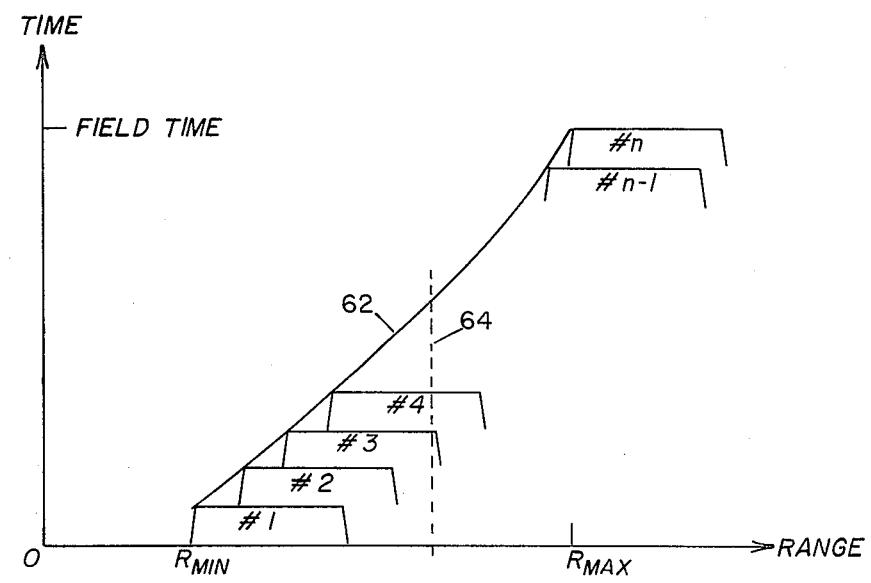
FIG. 4 is a preferred method of spatial energy pulse distribution.

Natural illumination of all targets within the area scanned may be provided by a proper range distribution of the spatial energy pulses within a single television field or frame time. To achieve equal illumination over an entire depth of range, the spatial energy pulses will be distributed in range similarly as those shown in FIG. 4. FIG. 4 discloses an exemplary spatial energy pulse distribution for a particular field time in an interlaced scan. By properly adjusting the distribution of the energy pulses and thus line 62, all targets within a television field will have equal intensity on the television monitor. Assuming, for example, that it is desired to observe a scene containing ranges from 100 meters to 1,000 meters and that the frequency of the master clock is chosen to represent ten-meter range increments, the spatial energy pulses detected by the camera will then occur at ranges of 100, 110, 120 ... 1,000 meters and should have width of greater than ten meters to ensure overlap. The number of spatial energy pulses occuring at each discrete range is chosen to approximate the shape of line 62. The shape of line 62, in general, will be determined by the width of the spatial energy pulses, the atmospheric conditions over the observation path, and by the desired energy distribution over that path. Since the information received during each scan line is stored and read out only once each frame time and since the television sensor integrates all light input over an entire frame time, all targets will have equal apparent visual intensity.

By drawing a vertical line such as line 64 (FIG. 4), one may see the number of pulses which illuminate a particular range within a frame time. $R_{max}$ receives greater illumination during the frame time than does $R_{min}$. The distribution of the spatial energy pulses at range R is proportional to $R^2$, (to compensate for the spread in the illuminator beam with range), and if compensation for the energy loss due to atmospheric scattering and attenuation is desired, the distribution of spatial energy pulses is further adjusted until the number of overlapping spatial energy pulses at range R compensates for this loss along the path.

It should also be noted that at greater distances (remembering that the pulse must illuminate the target and be reflected and that this requires a certain amount of time) it may be that a spatial energy pulse need not be emitted for each scan line but may be emitted only every second or third scan line. Obviously, there are many other techniques to achieve desirable spatial energy distributions. Accordingly, only an exemplary approach is disclosed herein.

We claim:

1. In an active-gated low light level television system having illuminating means and receiving means including a television camera, the method for scanning a wide depth of range during a television field to provide an image comprising the steps of:
   illuminating a scene with light pulses;
   gating on the receiving means at a discrete time after emission of said light pulses to receive reflected illumination;
   varying the time between illumination and the gating on of the receiving means during the field time of the television camera;
   whereby a plurality of range intervals (depths of field) are viewed during a single television field time.

2. The method set forth in claim 1 wherein said image has constant intensity, said constant intensity being achieved by:
   varying the time between the illuminating light pulses and the gating on of the receiving means so that illumination reflected from successively greater range intervals is observed more frequently to compensate for the decrease in energy density at longer ranges due to the spread in the illuminator beam, and to atmospheric scattering and attenuation along the path from the illuminator to the scene and therefrom to the camera.

3. The method set forth in claim 1 wherein said image is more intense at predetermined ranges than at other ranges viewed during the same television field, the desired intensity being achieved by:
   varying the time between the illuminating light pulse and the gating on of the receiving means;
   observing successively greater ranges more frequently to achieve a constant intensity image by compensating for the decrease in energy density at longer ranges due to the spread in the illuminator beam, and to atmospheric scattering and attenuation along the path from the illuminator to the scene and therefrom to the camera; and
   observing the particular range intervals for which greater intensity is desired more frequently than would be required for a constant intensity image from such intervals.

4. The method set forth in claim 1 wherein preselected range intervals within the depth of range being scanned may be suppressed by:
   varying the time between illumination and gating on of the receiving means such that illumination reflected from said suppressed range is never observed.

5. The method set forth in claim 1 wherein the time between illumination and gating on of the receiving means is varied by:
   loading a number indicative of the number of range intervals to the nearest range to be scanned into an up counter;
   loading a number indicative of the range intervals equivalent to one line time of a television camera into a down counter;
   comparing the outputs of said up counter and said down counter to provide an output to initiate an illumination pulse when said outputs are equal and gating on said receiving means when said counter reaches zero.

6. An active-gated television device comprising:
   an illuminator for illuminating a scene with pulses of light energy;
   receiving means including a video camera having a field scan time for receiving input scene illumination; and
   timing circuit means for controlling said illuminator and said receiving means so that said camera accepts reflected scene illumination energy at various times after pulses of illumination energy are emitted from said illuminator and during a said field scan time of said camera whereby a plurality of range intervals may be scanned during a single television field time.

7. An active-gated television device as set forth in claim 6 wherein said timing circuit means repetitively pulses said illuminator and said receiving means, successive pulses to said receiving means during said field scan time being time delayed with respect to pulses to said illuminator whereby said camera detects substantially equal energy at various ranges.

8. An active-gated television device as set forth in claim 6 wherein said timing circuit means pulses said illuminator and said receiving means, successive pulses to said receiving means during said field scan time being time delayed with respect to pulses to said illuminator whereby said camera detects less energy from a particular range increment to thereby enable scene suppression at such particular range increment.

9. An active-gated television device as set forth in claim 6 wherein said timing circuit means pulses said illuminator and said receiving means, successive pulses to said receiving means during said field scan time being time delayed with respect to pulses to said illuminator whereby said camera detects more energy from a particular range increment to thereby enable scene enhancement at such particular range increment.

10. An active-gated television device as set forth in claim 6 wherein said timing circuit means include:
    digital means for storing data indicative of said various times between emmission of illumination by said illuminator and acceptance of reflected illumination energy by said receiving means.

11. An active-gated television device as set forth in claim 6 wherein said receiving means comprises:
optic means being pulsed on to pass energy to said camera indicative of the impinging scene energy and pulsed off to prevent significant energy reflected from said scene from passing to said camera.

12. An active-gated television device as set forth in claim 11 wherein said timing circuit means comprises:
a memory for storing data, said data being indicative of the various time delays between successive pulses to said illuminator and pulses to said optical means to achieve various and select illumination levels to be detected by said camera for each range interval.

13. An active-gated television device as set forth in claim 6 wherein said timing circuit means comprises:
a digital memory for storing a plurality of numbers indicative of the number of times the time is to be held constant at which said camera is to accept reflected scene illumination after a previous pulse of illumination; and
digital counting means connected to said digital memory to advance said memory to the next successive number at a predetermined time during said field scan whereby said camera detects various and select illumination for each said range interval.

14. An active-gated television device as set forth in claim 13 wherein said successive numbers stored in said digital memory to control the apparent illumination of predetermined ranges as detected by said camera, are related to the attenuation and other atmospheric effects in the path of said illumination energy travel from said illuminator to successive range intervals and therefrom to said camera.

15. An active-gated television device as set forth in claim 6 wherein said timing circuit means comprises:
delay means connected to said illuminator and camera for causing said illuminator to emit energy during a camera line scan and at predeterminable various times before an interval between line scans.

16. The apparatus of claim 15 whrein said timing circuit means further comprises:
a memory for controlling the number of times said illuminator is successively pulsed at each of said predeterminable various times before an interval between line scans.

17. The apparatus of claim 15 wherein said delay means pulses said receiving means so that said camera accepts illumination energy only during camera blanking intervals.

18. An active-gated television device as set forth in claim 17 wherein said delay means causes said illuminator to emit energy during each horizontal scan of said camera and causes said camera to accept reflected illumination in said interval between each line scan.

19. The apparatus of claim 17 wherein said timing circuit means further comprises:
memory circuit means for controlling the number of times said illuminator is successively pulsed at each of the various predeterminable times before a camera line scan interval;
whereby the illumination at discrete range intervals may be varied to compensate for atmospheric and attenuation loss encountered by light energy traveling from said illuminator to the range intervals and therefrom to said camera.

20. An active-gated television automatic range sweep device comprising:
illumination means for illuminating targets at different range intervals;
receiving means including a television camera for receiving illumination reflected by said targets; and
timing means for controlling said illumination means and said receiving means such that discrete ranges are sequentially viewed during a television line time to thereby sweep out an entire depth of range within a television frame.

21. An active-gated television automatic range sweep device as set forth in claim 20 wherein said timing means comprises:
first down counting means;
up counting means; and
means for comparing the output of said up counting means and said first down counting means, said comparing means generating an output pulse when the count in said first down counting means and said up counting means are equal, said output pulse from said comparing means being connected to said illuminating means.

22. An active-gated television automatic range sweep device as set forth in claim 21 wherein said first down counting means produces an output pulse when the count herein is equal to zero, said output at zero being connected to said receiving means.

23. An active-gated television automatic range sweep device as set forth in claim 22 wherein the timing means further comprises a master clock connected to a first input of said first down counting means, the frequency of said clock being determined by the formula:

$$f = \frac{c}{2 \Delta R}$$

where $f$ is the frequency, $c$ is the velocity of light, and $\Delta R$ is the range accuracy (increment desired).

24. An active-gated television automatic range sweep device as set forth in claim 23 to further comprise a first register and a second register, said first register having a preset number therein equal to the minimum range to be scanned (the number of range increments out to the minimum range) and said second register having a number stored therein equal to the number of range intervals corresponding to one line time of said television camera.

25. An active-gated television automatic range sweep device as set forth in claim 24 to further comprise means for loading the numbers in said second register into said first down counting means at the line rate of said television camera and means for loading the number in said first register into said up counting means at the field rate of said television camera.

26. An active-gated television automatic range sweep device as set forth in claim 25 wherein said means for causing said up counting means to count up comprises a second down counting means, a program memory unit, and address register and gating means; said address register being responsive to the output of said gating means to thereby load progressive bits of information from said program memory unit into said second down counting means; said second down counting means having its output connected to said gating means; said gating means having its output connected to said counting means to cause said up counting means to count up in response to an output pulse from said gating means.

27. An active-gated television automatic range sweep device as set forth in claim 26 wherein said address register is responsive to the vertical sync pulse from said television camera to thereby reset said address register at the field rate of said television camera and wherein second down counting means is caused to count down at the line rate of said television camera.

* * * * *